United States Patent
Byrnes

(10) Patent No.: US 6,595,554 B2
(45) Date of Patent: Jul. 22, 2003

(54) INFINITELY SELECTABLE ANGLE PIPE FITTING

(76) Inventor: Dennis S. Byrnes, 113 Yale Ave., Lancaster, PA (US) 17603

(*) Notice: Subject to any disclaimer, the term of this patent is extended or adjusted under 35 U.S.C. 154(b) by 34 days.

(21) Appl. No.: 09/769,821

(22) Filed: Jan. 24, 2001

(65) Prior Publication Data

US 2001/0004153 A1 Jun. 21, 2001

Related U.S. Application Data

(63) Continuation-in-part of application No. 08/969,423, filed on Nov. 1, 1997, now Pat. No. 6,179,343, which is a continuation-in-part of application No. 08/677,676, filed on Jul. 8, 1996, now abandoned, which is a continuation-in-part of application No. 08/389,206, filed on Feb. 15, 1995, now abandoned.

(51) Int. Cl.[7] .............................................. F16L 21/08
(52) U.S. Cl. ....................... 285/179; 285/184; 285/181
(58) Field of Search ................................ 285/181, 184, 285/179, 2, 3

(56) References Cited

U.S. PATENT DOCUMENTS

| | | | |
|---|---|---|---|
| 791,397 A | 5/1905 | Asbury | |
| 872,331 A | 12/1907 | Dreier | |
| 913,366 A | 2/1909 | Donnelly | |
| 962,621 A | 6/1910 | Carlson | |
| 1,152,974 A | 9/1915 | Rice | |
| 1,566,002 A | 12/1925 | Hess | |
| 1,572,303 A | 2/1926 | Millspaugh | |
| 1,911,311 A | 5/1933 | Ernst | |
| 1,960,557 A | 5/1934 | Snyder | 137/75 |
| 2,449,265 A | 9/1948 | Williams | 138/49 |
| 2,449,754 A | 9/1948 | Seitz | 285/111 |
| 2,654,619 A | 10/1953 | Gaum | 285/179 |
| 2,710,204 A | * 6/1955 | Faith-Ell | 285/7 |
| 4,652,017 A | 3/1987 | Drechsel | 285/5 |
| 5,054,513 A | 10/1991 | Trueb et al. | 137/375 |
| 5,161,766 A | * 11/1992 | Arima | 248/447 |
| 6,003,814 A | * 12/1999 | Pike et al. | 285/302 |
| 6,101,673 A | * 8/2000 | Edin | 15/414 |

FOREIGN PATENT DOCUMENTS

| | | | |
|---|---|---|---|
| AU | 44109/72 | 1/1974 | 285/179 |
| FR | 0 608 726 | 6/1988 | 285/184 |
| GB | 691942 | 5/1953 | 285/212 |
| GB | 1 403 780 | 8/1975 | 285/179 |
| IT | 538451 | 1/1956 | 285/179 |
| JP | 6-66395 | 3/1994 | 285/184 |

* cited by examiner

*Primary Examiner*—Eric K. Nicholson
(74) *Attorney, Agent, or Firm*—Drinker Biddle & Reath LLP

(57) ABSTRACT

A pipe elbow is provided having two parts, each part having an arcuate segment and a linking member for connecting to a run of standard pipe. The arcuate segment of the first part fits into the arcuate segment of the second part. By severing a portion of the arcuate segment of the first part at an angle needed for a specific run of pipe and inserting it into the arcuate segment of the second part, the assembled elbow will conform to the required angle. In addition, the arcuate segment of the first part has an inner aspect which is provided with an extended curved region which extends to the collar. The second part is provided with a lip which fits conformingly with the extended curved region of the first part in order to meet industry standards for minimum overlap of mating parts, even at very obtuse angles.

24 Claims, 18 Drawing Sheets

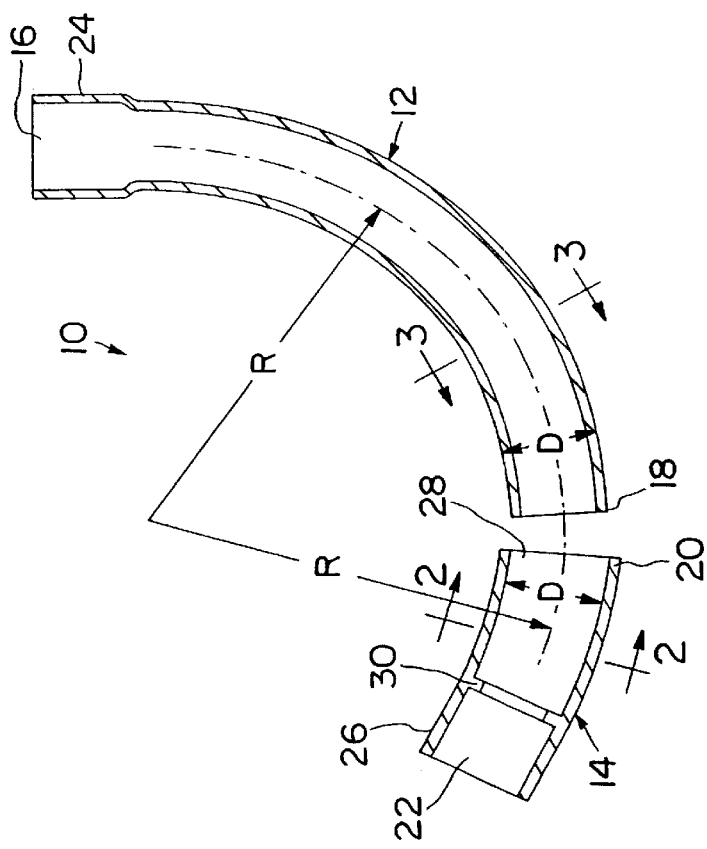
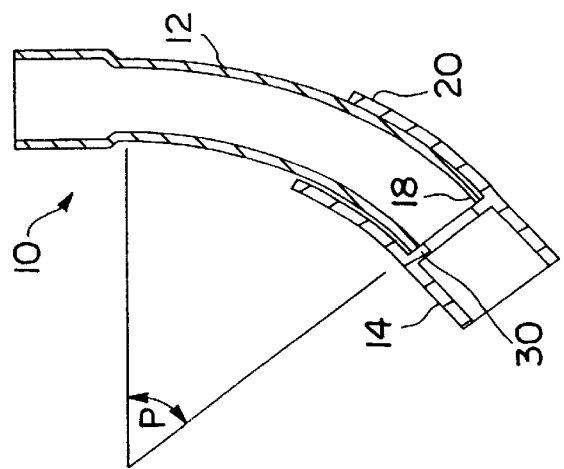

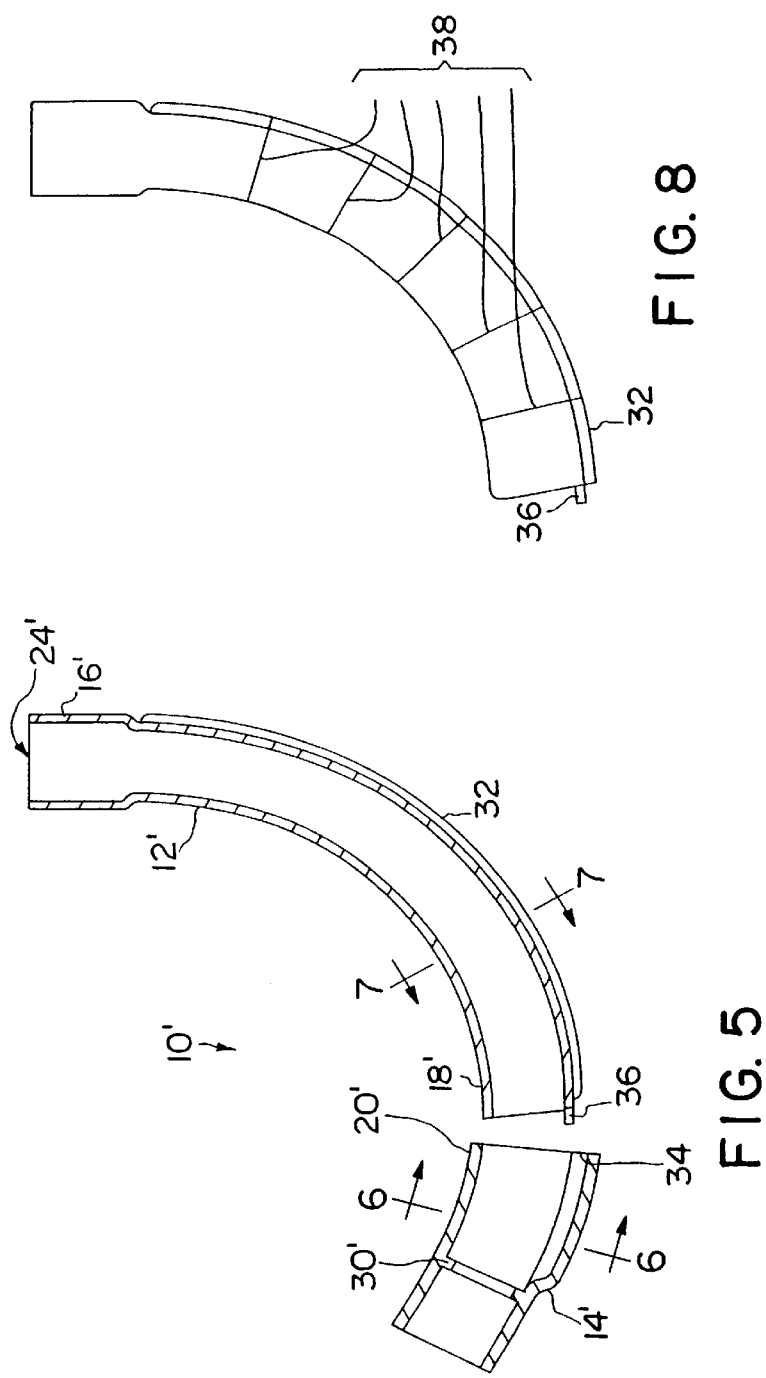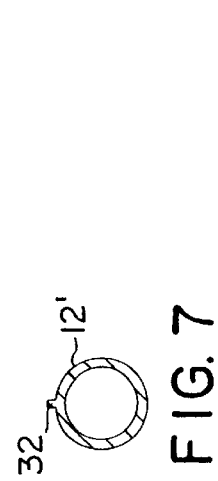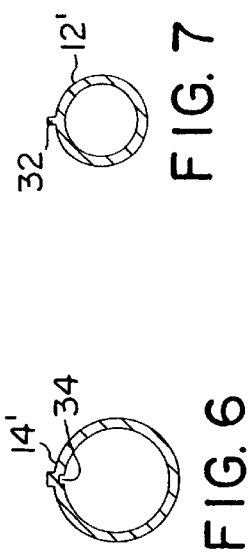

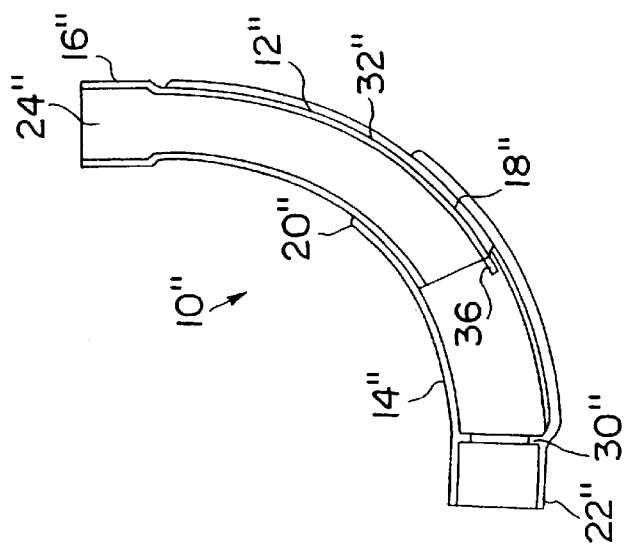
FIG. 11
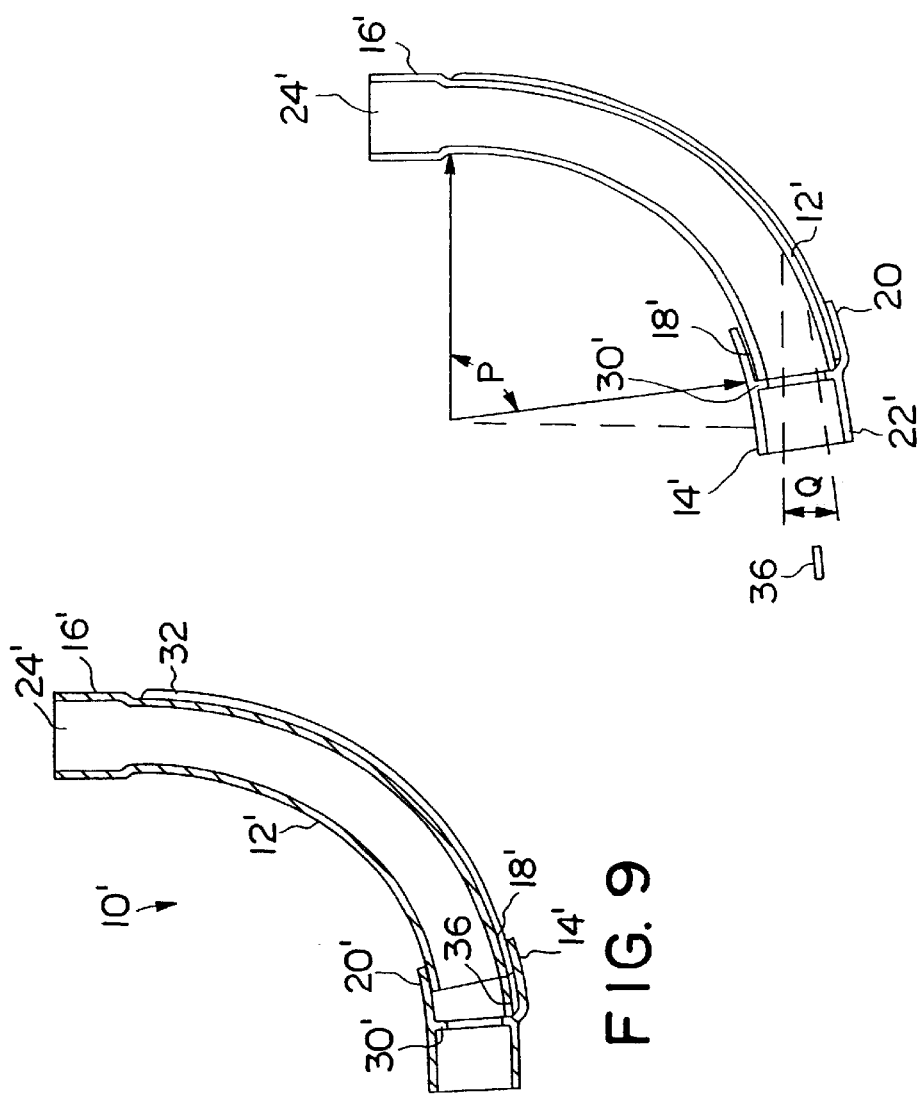
FIG. 10
FIG. 9

INFINITELY SELECTABLE ANGLE PIPE FITTING

CROSS REFERENCE TO RELATED APPLICATION

This is a continuation-in-part of application Ser. No. 08/969,423, filed Nov. 1, 1997, now U.S. Pat. No. 6,179,343 which is a continuation-in-part of application Ser. No. 08/677,676, filed Jul. 8, 1996, now abandoned, which is a continuation-in-part of application Ser. No. 08/389,206, filed Feb. 15, 1995, now abandoned.

FIELD OF THE INVENTION

The invention is in the field of pipe fittings, specifically pipe elbows and pipe connections.

BACKGROUND OF THE INVENTION

Most piping installations require changes of direction. With rigid pipe, the change in direction is effected with elbow-type fittings which attach to lengths of straight pipe. Conventional pipe elbows are available in fixed angular increments, typically ⅛ bend increments (90, 45, 22½ degrees). When a pipe layout requires an intermediate angular displacement, the pipe fitter finds himself in a difficult situation.

In some specific situations, provision is made for selecting a specific angular displacement. For example, U.S. Pat. No. 2,654,619 to Guam, describes a reducing elbow for welded pipe, part of which has constant radius of curvature and diameter. The pipe fitter can sever the elbow at the desired point and weld it into his run of pipe. Two cuts are required to be made exactly perpendicular to the axis of curvature to provide a weldable fit to the mating piece of pipe. Williams U.S. Pat. No. 2,449,265 provides a rubber automobile radiator hose which can be cut along lines marked to agree with specific automobile models. The hose depends on its elasticity at the cut end for attachment to the car radiator.

A need therefore exists for a pipe elbow which can be adapted to whatever angular displacement is required for a piping installation, and it is this need which the invention addresses.

DEFINITIONS

In what follows, these terms mean these things:

Proximal means the end of a pipe fitting to be connected to a run of pipe.

Distal refers to the end of a pipe fitting farthest from a run of pipe after it has been joined thereto.

Pipe refers to any rigid conduit with a continuous periphery, whether of round, rectangular, or other shape. For example, rectangular duct work is included in the term "pipe".

Dimensions hereunder means the set of dimensions necessary and sufficient to specify the cross-sectional configuration of a piece of pipe. For round pipe, the term refers to its diameter. When a pipe connection is described, clearance between the mating parts is to be understood as implied. The clearances contemplated are the standard industry clearances appropriate to the material used.

Inner aspect means the wall of an arcuate pipe closest to a center of curvature which is the center of a circle of which the wall is an arc segment.

Outer aspect means the wall of an arcuate pipe furthest from a center of curvature which is the center a circle of which the wall is an arc segment.

Arc refers to any curved line and is not limited to being a segment of a perfect circle. An arc associated with a constant radius of curvature is a segment of a circle.

SUMMARY OF THE INVENTION

The pipe fitting of the invention comprises two parts, each with a proximal, or upstream end, and a distal, or downstream end. The proximal end of the first elbow part and the distal end of the second elbow part are contemplated to accommodate standard pipes and fittings. The distal end of the first part has a constant radius of curvature which fits into the proximal end of the second elbow part. The second elbow part has the same radius of curvature as the first elbow part. The first elbow part can be precut to a desired included angle and inserted into the proximal end of the second elbow part. An internal stop is provided within the second elbow part. The distal end of the first elbow part is inserted into the second part until it bottoms against or abuts the stop, providing an elbow of fixed included angle. Alternatively, the first part may be inserted into the second part just far enough to provide the included angle which a given run of pipe requires.

The distal end of the first elbow part has an outer surface which has an inner aspect. The inner aspect defines an arc which extends along the entirety of an arcuate segment, from the distal end of the first part to the portion adapted to accommodate standard pipes. Thus, the invention is directed to an elbow having a first part with an extended region of curvature near the proximal end, (i.e. no flattened outer surface along its inner aspect). The proximal end of the second part has an expanded lip which is capable of conformingly fitting with the expanded region of curvature of the first part. Where the application requires that the first elbow part be cut for a very acute angle (as measured off an imaginary line extending from the end of a run of pipe to which the first part is connected), the expanded region of curvature of the first part and the lip of the second part provide for a minimum extension of the first elbow part into the second elbow part in order to meet industry standards for minimum insertion of mating parts.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 shows a longitudinal cross-section of an embodiment of a selectable angle pipe elbow of the present invention.

FIG. 2 shows a transverse cross-section of the selectable angle pipe elbow in FIG. 1 as taken along line 2—2.

FIG. 3 shows a transverse cross-section of the elbow as taken along line 3—3 in FIG. 1.

FIG. 4 shows a longitudinal cross section of an assembled elbow in accordance with FIGS. 1–3.

FIG. 5 shows a longitudinal cross-section of another embodiment of a selectable elbow of the present invention.

FIG. 6 shows a transverse cross-section of the elbow of FIG. 5 as taken along line 6—6.

FIG. 7 shows a transverse cross-section of the elbow in FIG. 5 as taken along line 7—7.

FIG. 8 shows a side plan view of a portion of the elbow embodiment in FIG. 5.

FIG. 9 shows a longitudinal cross-section of an assembled elbow in accordance with FIGS. 5–8 with a frangible tab in place.

FIG. 10 shows a longitudinal cross-section of an assembled elbow in accordance with the embodiment of FIGS. 5–8 with the frangible tab removed.

FIG. 11 shows a cross-section of a further embodiment of an assembled selectable pipe elbow as contemplated by the present invention.

DETAILED DESCRIPTION OF THE DRAWINGS

Figure 13:
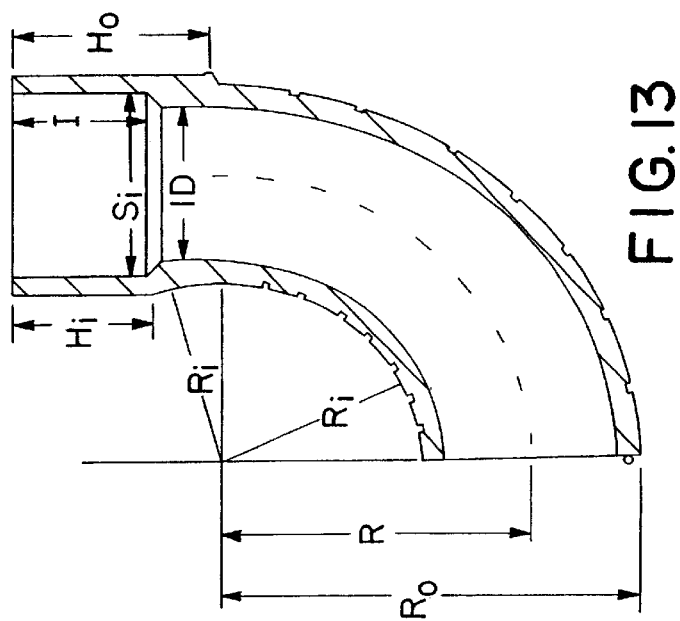
FIG. 13 shows a longitudinal cross-section of the selectable angle pipe elbow in FIG. 12.

In the drawings where like numerals identify like elements, there is shown embodiments of a selectable angle pipe elbow comprising two separate parts. The elbow in FIG. 1 is generally identified by the numeral 10.

The first part 12 of the elbow 10 and the second part 14 of the elbow 10 are depicted in FIG. 1 in longitudinal cross-section. FIG. 2 is transverse cross-section of the second elbow part 14 having an inside diameter "D". FIG. 3 is a transverse cross-section of the first elbow part 12. The outside diameter of the first elbow part 12 also has a dimension of "D". As shown in FIG. 4, the first part 12 and the second part 14 of the elbow 10 are adapted to mate with one another to form an elbow within a run of pipe (not shown).

The first elbow part 12 includes a proximal end 16 and a distal end 18. The second elbow part 14 includes a proximal end 20 and a distal end 22. The proximal end 16 of the first elbow part 12 comprises a socket 24 which is adapted to fit over a straight standard pipe or over other types of pipe fittings (not shown). From the socket 24 at its proximal end 16 to its distal end 18, the first elbow part 12 is arcuate, with a constant axial radius of curvature "R".

The distal end 22 of the second elbow part 14 also comprises a socket 26 which fits over a straight standard pipe length or over a pipe fitting (not shown) as desired. The proximal end 20 of the second elbow part 14 comprises an arcuate socket 28 which has a constant radius of curvature R, the same as the curvature of the distal end 18 of the first elbow part 12. A boss 30 between the proximal end 20 and the distal end 22 of the second elbow part 14 forms an internal stop. The penetration of the first elbow part 12 into the arcuate opening in the proximal end 20 of the second elbow part 14 is limited by the boss 30, as seen in FIG. 4.

The angle that the assembled elbow 10 (FIG. 4) forms is determined by the arc length of the distal end 18 of the first elbow part 12. The pipe fitter will sever a pre-specified portion of the first elbow part 12 from the distal end 18. When the first part 12 is inserted into the proximal end 20 of the second part 14 and the first part 12 bottoms on the boss 30, a specific angle "P" is formed by the elbow 10. The more material removed from the distal end 18 of the first elbow part 12, the shorter the elbow 10 and the smaller the angle P.

FIG. 5 shows another embodiment of the present invention wherein, the first part 12' of the elbow 10' includes an alignment key or spine 32 on its outside surface and the second part 14' includes a corresponding alignment keyway or slot 34 on its inside surface. In FIG. 6, the keyway 34 is shown in the inside surface of the proximal end 20' of the second elbow part 14'. The alignment key 32 is shown in FIG. 7 to project from the outside surface of the first elbow part 12'. As illustrated in FIGS. 5 and 8, the alignment key 32 projects along the arc of the first elbow part 12' from a position adjacent the socket 24' on the proximal end 16' and extends over the arc of the first elbow part 12' to the distal end 18'. The key 32 may be intermittent along the arc of the first part 12'. However, it is contemplated that the keyway 34 will extend along the entire length of the inside surface of the second part 14', starting at the proximal end 20' and ending adjacent the boss 30'. The key 32 and keyway 34 facilitate assembly of the two elbow parts 12' and 14' in the proper planar relationship. A similar type alignment means may also be included with the elbow portions. For example, the cross-sectional configuration of the elbow parts may be non-circular. Thus, the mating of the first and second elbow parts will occur only upon proper alignment of the cross-sections. The cross-sections may include oval, square, rectangular, a non-uniform cross-section, etc.

As shown in FIGS. 5 and 8, also included in this embodiment of the elbow 10' is a frangible tab 36 which projects from the distal end 18' of the first elbow part 12'. The tab 36 projects to a radial position equal to the distal end of the first elbow part 12'. As shown in FIG. 9, the first elbow part 12' with the tab 36 may be inserted into the proximal end 20' of the second elbow part 14'. The tab 36 abuts the boss 30' within the second elbow part 14' and spaces the distal end 18' of the first elbow part 12' from the stop formed by the boss 30' in the second part 14'. The tab means may also be provided on the outside surface of the first elbow part. Here, the tab would abut the tube wall on the second elbow part to prevent complete insertion of distal end 18' of the first part into proximal end 20' of the second part.

In FIG. 8, there is shown on the outside surface of the first elbow part 12' a series of cutting guides 38. The cutting guides 38 are positioned at preselected convenient intervals along the arcuate length of the first elbow part 12'. These cutting guides 38 provide the pipe fitter with a mark to make cuts so as to form the elbow 10' at the desired angle. Of course, the cutting of a portion of the distal end 18' of the first elbow part 12' will remove a portion of curved pipe as well as the tab 36 projecting from the distal end 18'. If the tab is formed on the outside surface of the first part 12', there may be a number of tabs formed at different positions along the length of the elbow portion.

Alternatively, if only a slight angle adjustment is desired, the tab 36 itself can be removed from the distal end 18' of the part 12'. This type of adjustment is shown in FIG. 10. Removal of the tab 36 from the distal end 18' of the first part 12' results in a slight decrease in the angle P. It is contemplated that without the tab 36 being removed, the angle P of the elbow 10' will be 90°. The removal of the tab 36 may be used when flow through a lateral pipe run will depend on gravity (as in drains). Thus, the pipe (not shown) connected downstream from the distal end 22' of the second elbow part 14' will lie at a small angle Q below the horizontal. The angle Q, which is contemplated to be that often specified as a minimum in building codes for a drain pipe, will be equal to the reduction from 90° in angle P.

Without the features of the present invention, when a pipe is to be connected to a conventional 90° elbow one side of which is plumb, the small angle Q to the horizontal must be accomplished by bending the straight run of lateral pipe. This pipe bending puts strain on the assembly and is awkward to install. Of course, other angles are possible by removal of an additional curved pipe section from the distal end 18' of the first pipe portion 12' prior to insertion into and fusion with the second elbow portion 14'.

Yet another embodiment of the elbow 10" is shown as assembled in FIG. 11. In this embodiment, the proximal, arcuate end 20" of the second elbow part 14" is elongated. Thus, the engagement between the first elbow part 12" and the second elbow part 14" may be easily formed without removal of a portion of the distal end 18" of the first part 12" in forming the angle of the elbow. The pipe fitter would insert the distal, arcuate end 18" of the first part 12" of the elbow 10" only as far as the pipe layout requires. In this embodiment, the proximal end 20" of the second elbow part 14" may also be cut in addition to or as an alternative to cutting the distal end 18" of the first part 12". The position of the cut is also not critical to the angular displacement of the pipe run, since the pipe fitter can adjust the elbow to the requisite included angle as he lays his run of pipe by sliding the two pipe portions 12", 14" along the key 32".

Figure 14:
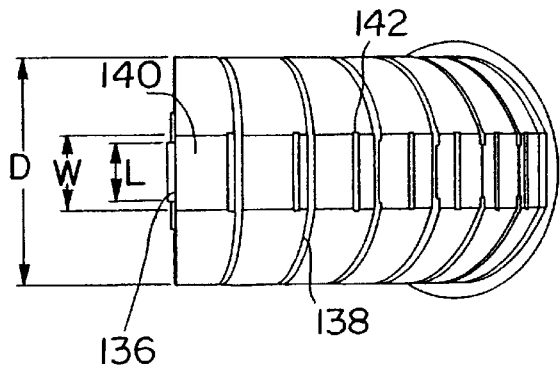
FIG. 14 is a top plan view of the portion of the elbow in FIG. 12 as taken along line 14—14.
Figure 15:
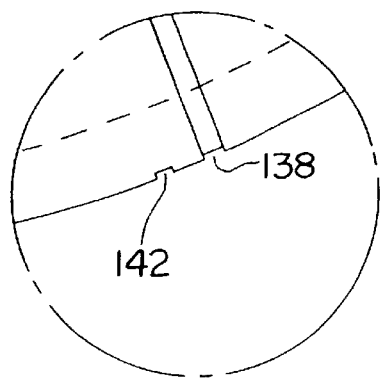
FIG. 15 is an enlarged view of a portion of FIG. 12.
Figure 16:
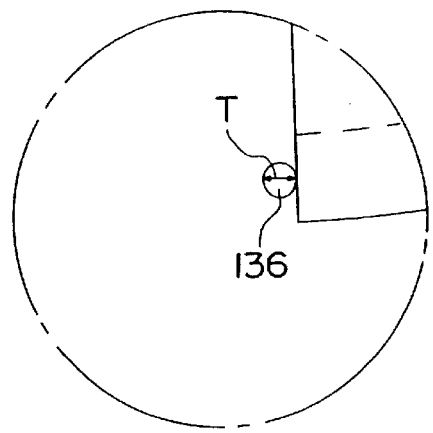
FIG. 16 is an enlarged view of a portion of FIG. 12.
Figure 17:
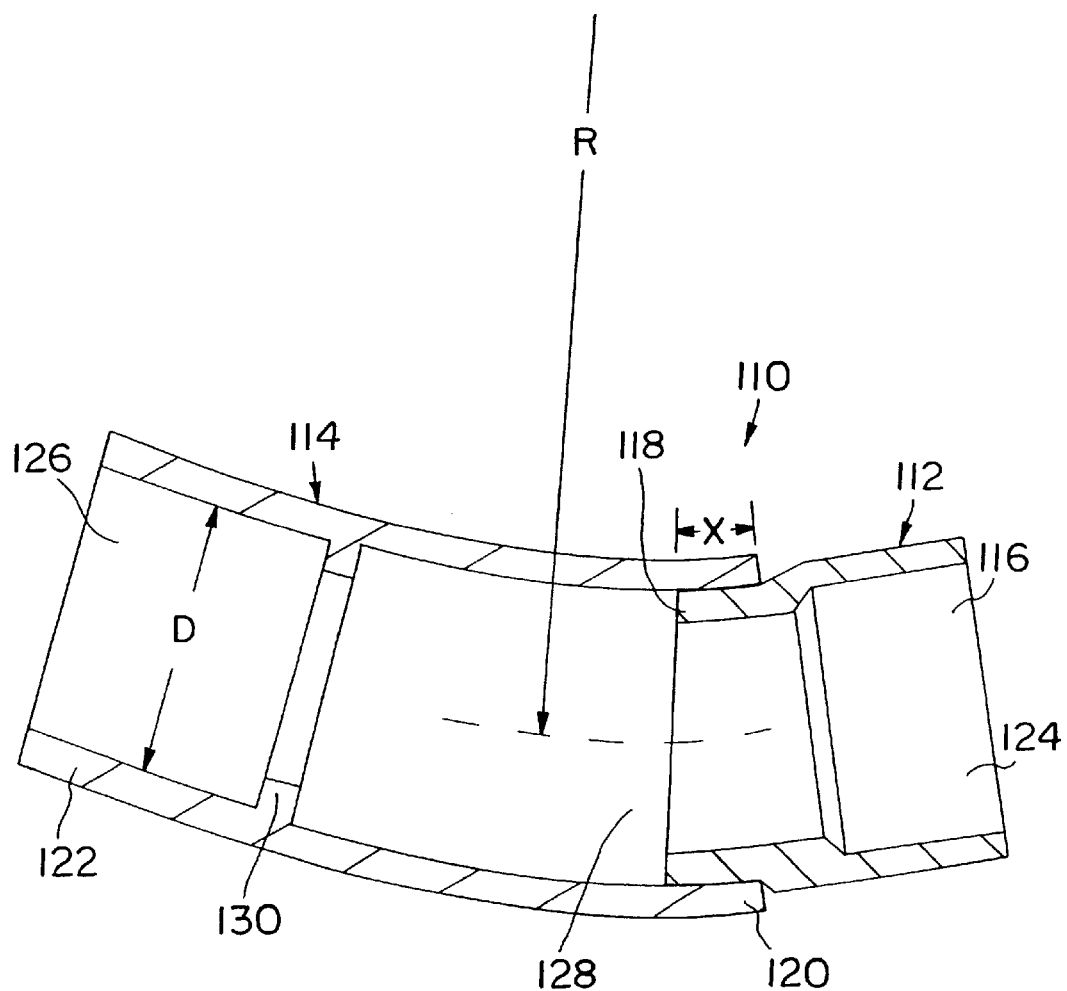
FIG. 17 shows a longitudinal cross-section of an assembled elbow for the embodiment shown in FIG. 12.

FIGS. 12 through 17 show another embodiment of the present invention. As shown in FIGS. 13, 14 and 17, the outer diameter of the first elbow part 112 and the inner diameter of the second elbow part 114 have a dimension D. The first elbow part 112 and the second elbow part 114 are adapted to mate with one another to form an elbow 110 within a run of pipe (not shown). In this embodiment, dimension D is preferably 2.02 inches and the inner diameter of the first elbow part 112 has a dimension ID of 1.61 inches.

The first elbow part 112 includes a proximal end 116 and a distal end 118. The second elbow part 114 includes a proximal end 120 and a distal end 122. The proximal end 116 of the first elbow part 112 comprises a socket 124 which is adapted to fit over a straight standard pipe or over other types of pipe fittings (not shown). The depth I of socket 124 preferably is 1.22 inches. From the proximal end 116 to the distal end 118, the first elbow part 112 is arcuate, with a constant axial radius of curvature R, preferably measuring 2.85 inches, and an inner radius of curvature $R_i$, preferably 1.84 inches. The distal end 122 of the second elbow part 114 also comprises a socket 126 which fits over a straight standard pipe or over a pipe fitting (not shown). The proximal end 120 of the second elbow part 114 comprises an arcuate socket 128 having a constant radius of curvature R which is preferably the same as the curvature of the distal end 118 of the first elbow part 112.

The first part 112 of the elbow includes a flat alignment plane 140 (FIG. 14) on its outside surface which extends from the socket 124 to the distal end 118. The width W of the flat plane 140 preferably measures 0.67 inches. The second elbow part 114 includes a corresponding flat alignment plane on its inside surface (not shown). The flat alignment plane serves as a key to facilitate assembly of the first elbow part 112 and the second elbow part 114 in the proper planar relationship by preventing one part from twisting out of alignment with the other.

Figure 12:
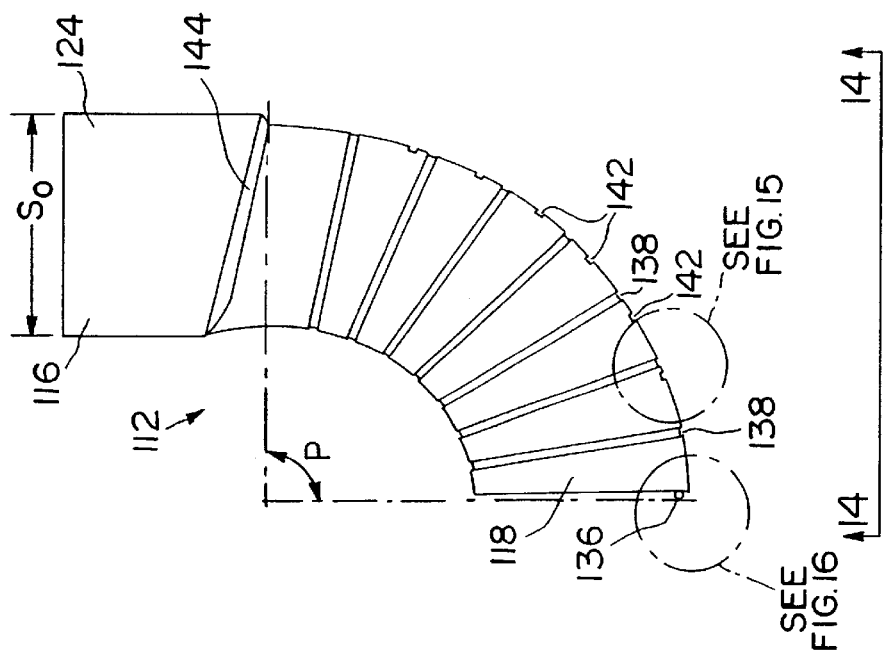
FIG. 12 shows a side plan view of a portion of another embodiment of a selectable elbow of the present invention.

Referring to FIGS. 12 and 14, the flat alignment plane 140 of the first elbow part 112 includes a series of reference marks 142 for estimating angle P. Reference marks 142 preferably are formed in 10° increments or intervals along the arcuate length of the flat alignment plane 140 of the first elbow part 112. A series of cutting guides 138 are provided on the outside surface of the first elbow part 112. The cutting guides 138 are preferably located every 11.25° along the arcuate length of the first elbow part 112. The cutting guides 138 provide the pipe fitter with a mark to make cuts so as to form the elbow at the desired angle.

Also included in this embodiment of the elbow 110 is a frangible tab 136 which projects from the distal end 118 of the first elbow part 112. The tab 136 preferably has a length L of 0.51 inches (FIG. 14) and a radius T of 0.04 inches (FIG. 16). The tab 136 abuts the boss 130 in the second elbow part 114 to prevent complete insertion of distal end 118 of the first part 112 into the proximal end 120 of the second elbow part 114. With the tab 136 in place, the angle P (shown in FIG. 12) of the first elbow part 112 will be 90°. If only a slight angle adjustment is desired, the tab 136 can be removed from the distal end 118 of the first part 112, thereby reducing the angle P of the first elbow part 112 preferably in the range of 88°.

The proximal end 116 of the first elbow part 112 comprises a socket 124 which is adapted to fit over a straight standard pipe or over other types of pipe fittings (not shown). Socket 124 has an outer diameter $S_o$ which is greater than dimension D of the first elbow part 112. The outside surface of socket 124 ends a short distance from the proximal end 116 and forms an uneven or angled external shoulder 144, with the shoulder height $H_i$ at the inner radius of curvature $R_i$ being lower than the height $H_o$ of the shoulder at the outer radius of curvature $R_o$. The proximal end 120 of the second elbow part 114 is formed so that if enough material is removed from the distal end 118 of the first elbow part 112 to allow the proximal end 120 to abut the shoulder 144, the proximal end 120 will abut the shoulder around the circumference of the first elbow part 112. The uneven or angled external shoulder 144 and the formation of the proximal end 120 to abut the shoulder 144 around the circumference of the first elbow part 112 provides for overlap between the first elbow part 112 and the second elbow part 114 at the inner radius of curvature $R_i$ even when the distal end 118 of the first elbow part 112 is cut at the cutting guide closest to the shoulder 144. Generally, when a first elbow part having a straight, rather than uneven or angled, shoulder is cut short, there is insufficient overlap of the first and second parts to ensure proper mating of the two parts. This configuration of shoulder 144 and proximal end 120 provides extension X of the first elbow part 112 into the second elbow part 114 even at small angles and meets industry standards for minimum insertion or overlap of mating parts (refer to FIG. 17). In this embodiment, the preferred outer diameter $S_o$ of the socket measures 2.25 inches and the inner diameter $S_i$ of the socket is 1.89 inches. The height $H_i$ preferably measures 1.29 inches and $H_o$ is preferably 1.83 inches.

Figure 18:
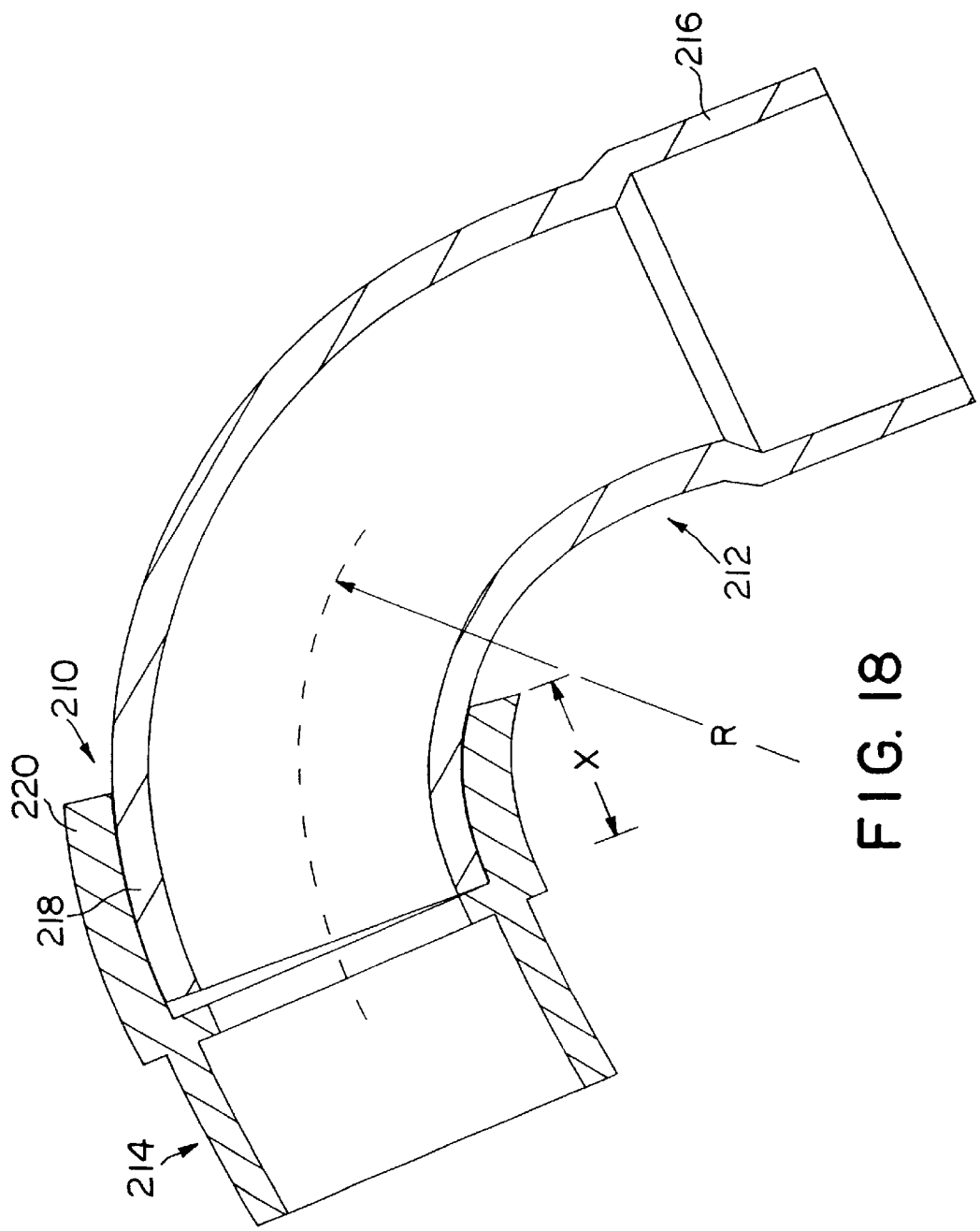
FIG. 18 shows a cross-section of another embodiment of the present invention.
Figure 21:
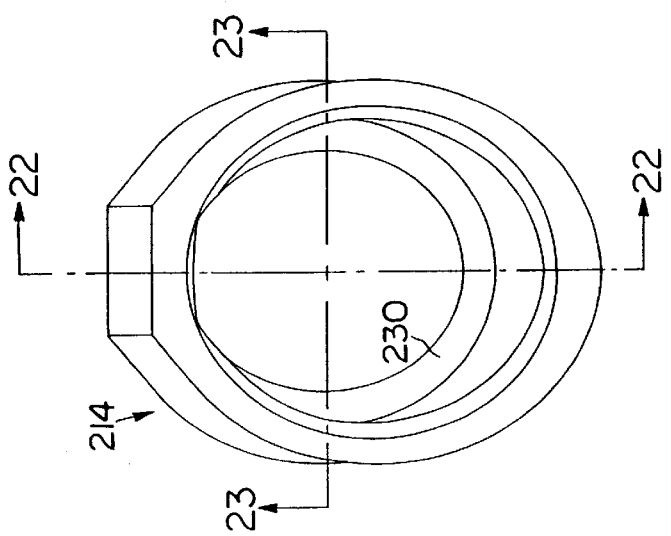
FIG. 21 is a perspective view of the portion of the elbow in FIG. 18.

FIGS. 18 through 23 show another elbow embodiment 210 of the present invention. As shown in FIG. 18, the proximal end 220 of a second elbow part 214 is adapted to mate with the distal end 218 of a first elbow part 212 to form the elbow 210 within a run of pipe (not shown).

Figure 19:
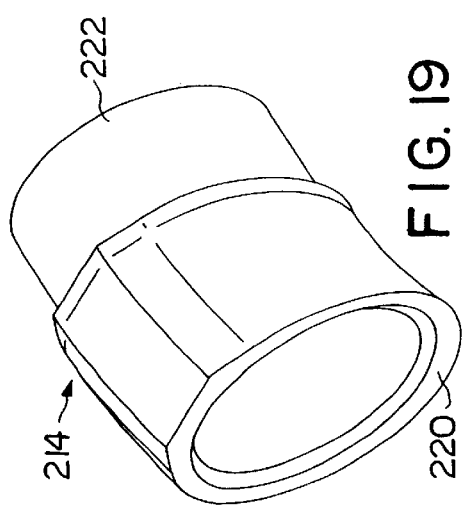
FIG. 19 is a perspective view of a portion of the elbow embodiment shown in FIG. 18.
Figure 20:
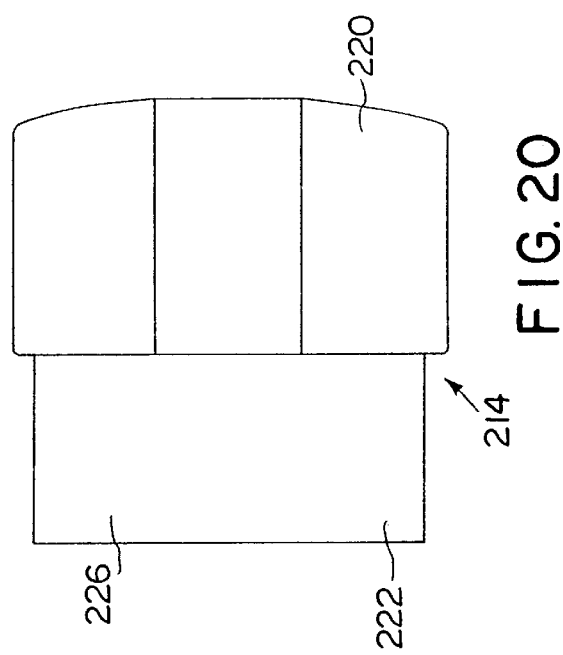
FIG. 20 is a top plan view of a portion of the elbow embodiment in FIG. 18.
Figure 22:
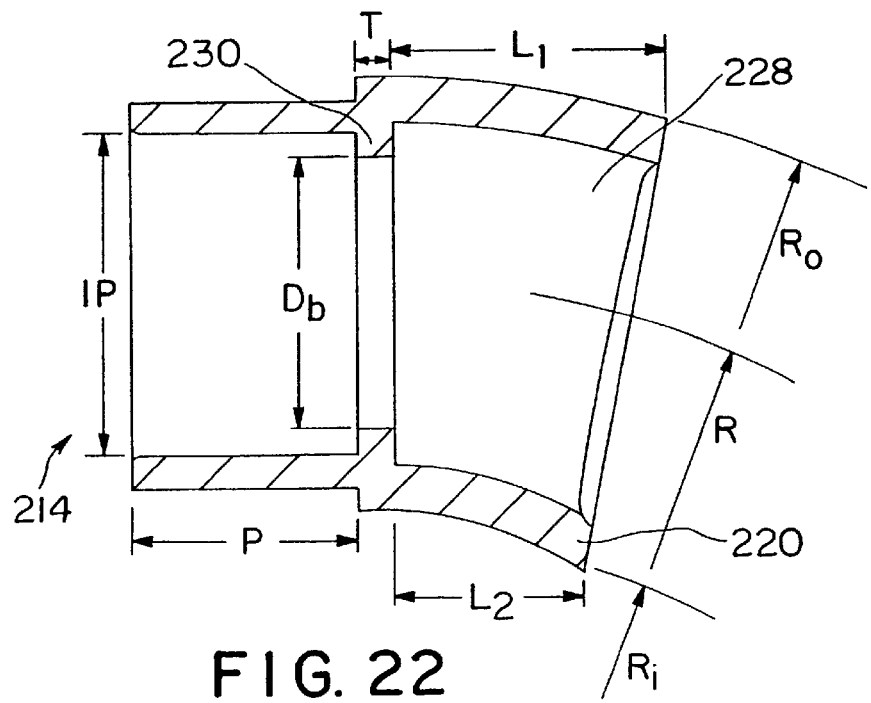
FIG. 22 is a cross-section of a portion of the elbow embodiment as taken along line 22—22 in FIG. 21.

FIGS. 19 and 20 show the second elbow part 214 which includes a proximal end 220 and a distal end 222. The distal end 222 of the second elbow part 214 also comprises a pipe section 226 which fits inside a straight standard pipe length (not shown). The distal end may also be sized to connect with a straight pipe fitting or socket (not shown) for connection to a length of pipe (also not shown) which may be of the same outer diameter as section 226 on the distal end 222. FIG. 22 shows that section 226 has an inner diameter IP which is preferably 1.89 inches and a section length P which is preferably 1.22 inches.

Figure 23:
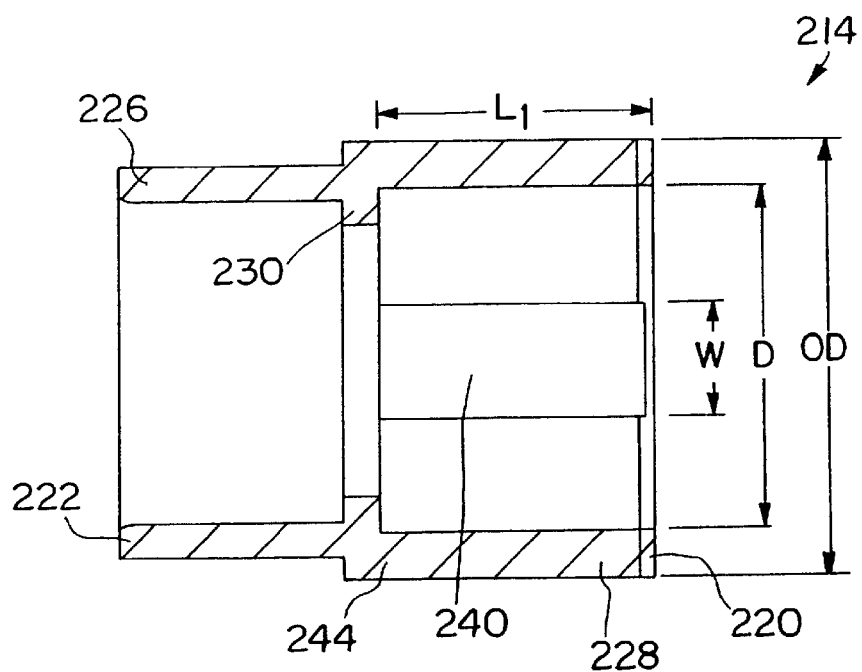
FIG. 23 is a cross-section of a portion of the elbow embodiment as taken along line 23—23 in FIG. 21.

The proximal end 220 of the second elbow part 214 comprises an arcuate socket 228. The socket 228 has a constant radius of curvature R, the same as the curvature of the distal end 218 of the first elbow part 212. FIGS. 18, 22 and 23 show that the socket 228 has an outer diameter OD which is greater than the inner diameter D of the second elbow part 214. The outside surface of the socket 228 ends a short distance from the proximal end 220 and forms an external shoulder 244 that is perpendicular to the distal end 222 of the second elbow part 214. The height $L_2$ of the shoulder 244 at the inner radius of curvature $R_i$ of the second elbow part 214 is lower than the height $L_1$ of the shoulder at the outer radius of curvature $R_o$ of the second elbow part 214. The outer diameter OD of the socket 228 preferably measures 2.57 inches and the inner diameter D is 2.02 inches. $L_1$ measures preferably 1.47 inches and $L_2$ is preferably 1.02 inches.

As shown in FIGS. 22 and 23, an internal boss 230 is situated between socket 228 and pipe section 226. The boss 230 preferably has a thickness T of 0.19 inches and a height or boss diameter $D_b$ of 1.61 inches. When the distal end 218 of the first elbow part 212 is inserted into the socket 228 and stops against the boss 230, the shoulder 244 ensures a minimum extension or overlap X between the first elbow part 212 and the second elbow part 214 at the inner radius of curvature $R_i$ even when the distal end 218 of the first elbow part 212 is cut at the cutting guide closest to the proximal end 216 of the first elbow part 212. Otherwise, when the first elbow part is cut short, there may be insufficient overlap of the first and second parts to ensure proper mating of the two parts. In contrast, the overlap provided will meet industry standards for minimum insertion of mating parts (refer to FIG. 18).

Referring to FIG. 23, the second elbow part 214 includes a flat alignment plane 240 on the inside surface of the socket 228. The plane 240 extends the full length of the socket 228 from the boss 230 to the proximal end 220 of the second elbow part 214. The width W of the flat plane 240 preferably measures 0.67 inches. The first elbow part 212 (FIG. 18) includes a corresponding flat alignment plane on its outside surface (not shown). The flat alignment plane facilitates assembly of the first elbow part 212 and the second elbow part 214 in the proper planar relationship by preventing one part from twisting out of alignment with the other part. The flat plane on either part of the elbow can also be used to rest the part on a table top or the like during assembly. When resting on the flat surface the part will stay in position without falling over.

FIGS. 24 through 37 show in detail the embodiment of the present invention which is illustrated in FIGS. 12 and 13. The elbow of this embodiment is generally identified by the numeral 310.

Figure 24:
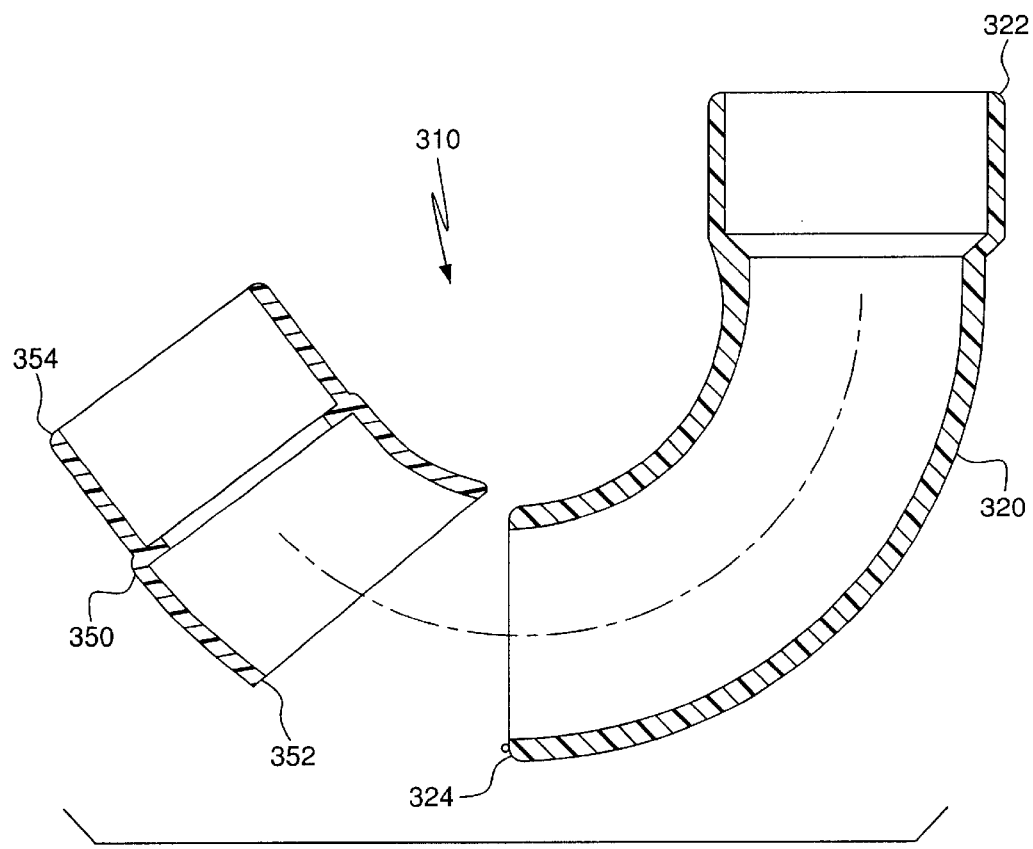
FIG. 24 shows a longitudinal cross-section of an embodiment of a selectable angle pipe elbow according to the present invention.

The elbow 310 has a first part 320 and a second part 350 which are shown in longitudinal cross-section in FIG. 24. The first part has a proximal end 322 and a distal end 324. Similarly, the second part has a proximal end 352 and a distal end 354. The distal end 324 of the first elbow part 320 is adapted to mate with the proximal end 352 of the second elbow part 350. Both parts have an inside and an outside, the inside being that area within the walls of the elbow through which fluid is meant to flow. The inside surface is, therefore, not visible once the elbow has been assembled within a run of pipe. The outside surface is the area which remains visible (except for the distal end of the first part, explained in detail below) after the elbow has been assembled. In addition, each part has an inner and an outer aspect. The inner aspect is the wall of a curved pipe which is closest to the center of curvature (typically the wall with the shortest arc length). Conversely, the outer aspect is the wall of a curved pipe which is farthest from the center of curvature (typically the wall with the longest arc length).

Figure 25:
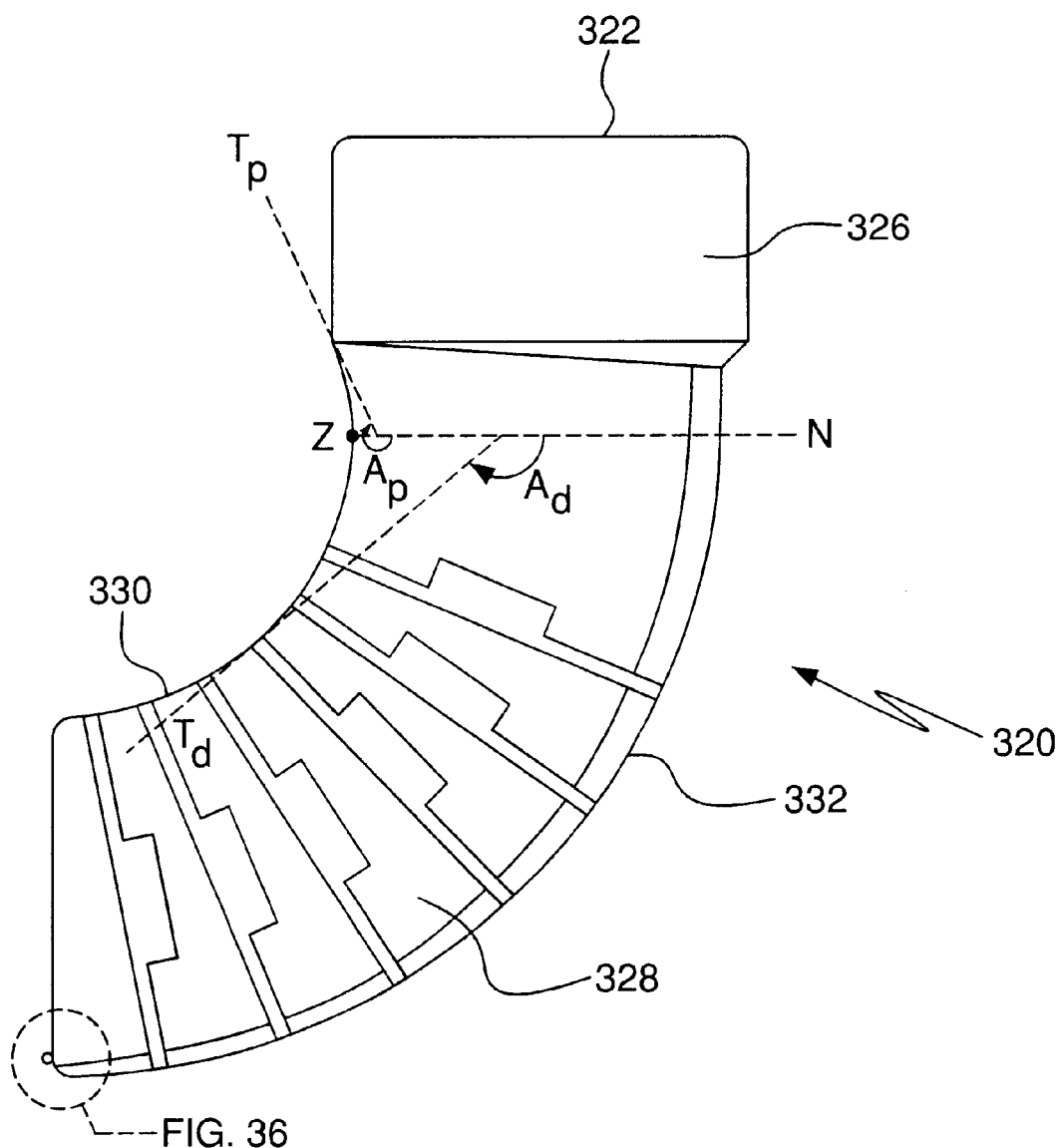
FIG. 25 is a side plan view of a first elbow part according to the embodiment of FIG. 24.

FIG. 25 shows a side view of the first elbow part 320 which has a proximal end 322 and a distal end 324. A linking member 326 is provided at the proximal end 322 for engaging a standard pipe. Preferably, the linking member 326 is in the form of a coupling or collar for engaging the outside of the standard pipe. However, it is contemplated that the linking member 326 can be any known element for connecting fittings or pipe, such as a reducing fitting, or a length of straight pipe for fitting into a separate coupling. Adjacent the linking member 326 is an arcuate segment 328. It should be understood that the arcuate segment 328 may have surfaces formed from segments other than perfect arcs. As shown in the drawings and described herein, the arcuate segment has variable transverse cross sections adjacent the proximal end. The arcuate segment 328 has an external dimension D, similar to that described with reference to FIG. 3, at its distal end 324. The arcuate segment 328 preferably has an overall curvature of 90 degrees. However, it is contemplated that the curvature can be less than or greater than 90 degrees, such as to form a 180 degree angle. The curvature of the arcuate segment provides the first part with an inner aspect 330 and an outer aspect 332. A frangible tab 334, which will be described in greater detail below, is provided on the distal end 324.

Figure 26:
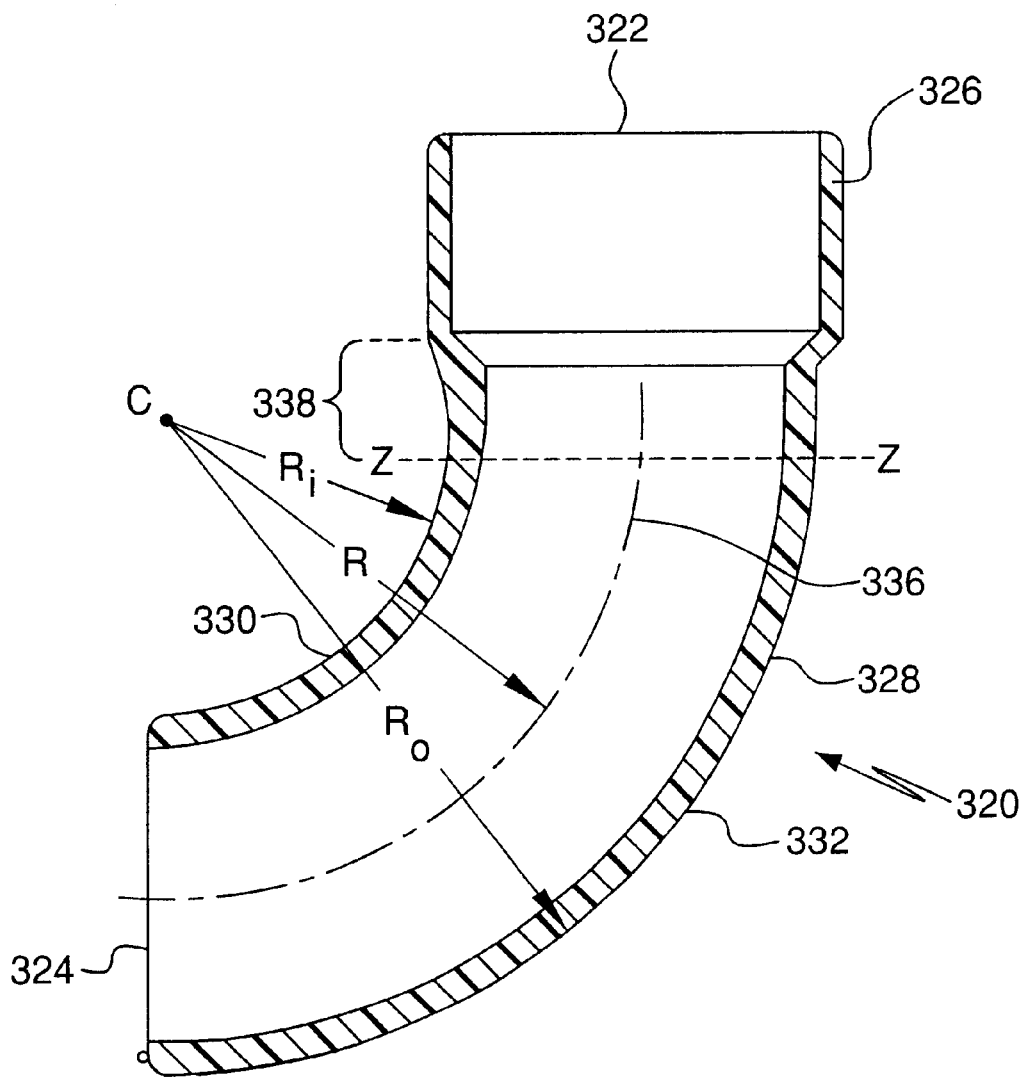
FIG. 26 shows a longitudinal cross-section of the first elbow part of FIG. 25.

FIG. 26 shows a longitudinal cross section of the first elbow part 320. The arcuate segment 328 has a central axis 336. A plane ZZ transects the arcuate segment 328 transverse to the central axis 336. That portion of the central axis 336 between the distal end 324 and the plane ZZ has a constant axial radius of curvature R and a center of curvature C. Thus, an arc is defined by central axis 336 between the plane ZZ and the distal end 324, the arc preferably being about 90 degrees, or about $\pi/2$ radians.

The outside surface of the inner aspect 330 of the arcuate segment 328 defines a second arc, preferably of shorter arc length than that defined by the central axis 336. The arc defined by the outside surface of the inner aspect 330 has about the same curvature (i.e. number of degrees) as the first arc, preferably about 90 degrees, between the distal end 324 and the plane ZZ and has a substantially constant inner radius of curvature $R_i$. The outside surface of the inner aspect 330 continues to curve beyond the plane ZZ toward the proximal end 322, the curvature preferably continuing to the point at which the arcuate segment 328 meets linking member 326. Thus, the outside surface of the inner aspect 330 defines an arc of a greater number of degrees than the arc defined by the central axis 336. In the most preferred form of the invention, the segment of the outside surface of the inner aspect 330 between plane ZZ and linking member 326 has the same substantially constant inner radius of curvature $R_i$ as the portion of the outside surface of inner aspect 330 between the distal end 324 and plane ZZ.

The outside surface of the outer aspect 332 defines an arc having a constant outer radius of curvature $R_o$ between the distal end 324 and the plane ZZ. The outside surface of the outer aspect 332 between the plane ZZ and the proximal end 322 may be a variable distance from the center of curvature C. In the preferred embodiment, the outside surface of the outer aspect 332 between the plane ZZ and the proximal end 322 is a greater distance away from the center of curvature C than the distance represented by the radius $R_o$.

Referring again to FIG. 25, the outside surface of the inner aspect 330 may be described as having a transition point Z, preferably, but not necessarily within plane ZZ. A line "N", drawn normal to the outside surface of the inner aspect 330 through point Z, is parallel with a shoulder of the linking member 326 where the linking member 326 and the arcuate segment 328 meet. Point Z divides the outside surface of the inner aspect into a first curve between the distal end 324 and the point Z and a second curve extending from point Z toward the proximal end 322. The first curve has tangent lines, $T_d$, which form angles, $A_d$, with the normal line, N, of between 90 and 180 degrees. The second curve has tangent lines, $T_p$, which form angles, $A_p$, with the normal line, N, of between 180 and 270 degrees when measured in the same direction as the angles $A_d$.

The outside surface with constant inner radius of curvature $R_i$ (FIG. 26) of inner aspect 330 is preferably formed by providing a thickened wall region 338 between plane ZZ and linking member 326.

In an embodiment sized to fit within a 1 and ½ inch pipe system, $R_i$ is preferably about 1.63 inches. Thus, the total arc length (from the distal end 324 to the linking member 326) defined by the outside surface of the inner aspect 330 is greater than about 1.63 $\pi/2$ or about 0.81 $\pi$ inches, arc length being equal to the product of the radius and the angle.

Figure 27:
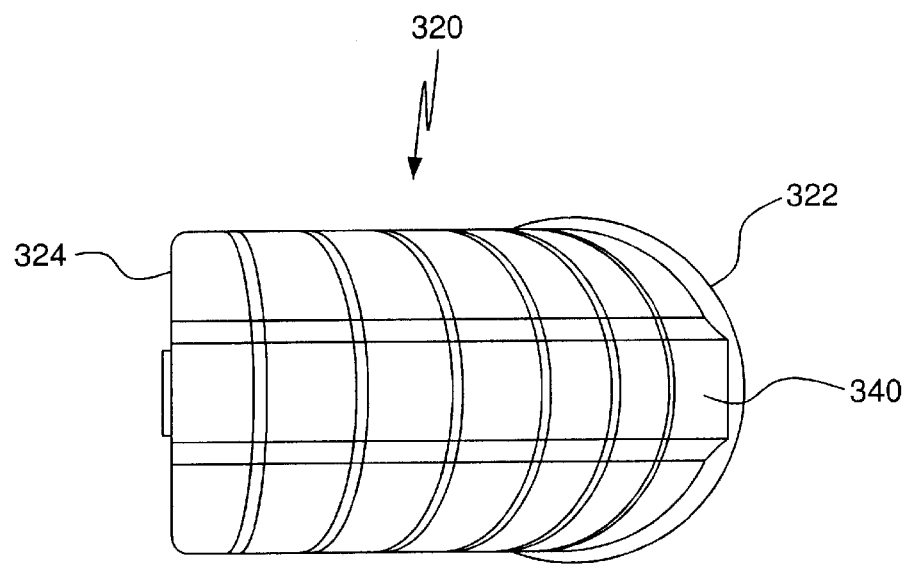
FIG. 27 is a top plan view of the first elbow part shown in FIG. 25.

FIG. 27 is a view of the outer aspect 332 of the first elbow part 320. The outer aspect 332 is preferably provided with a flattened area 340 which acts as an alignment plane as described with reference to FIG. 14 above.

Figure 28:
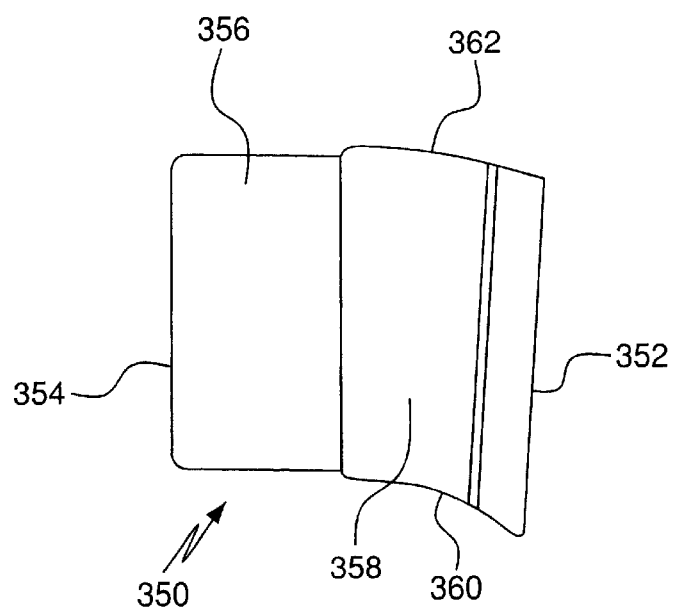
FIG. 28 is a side plan view of a second elbow part according to the embodiment of FIG. 24.

FIG. 28 is a side view of the second elbow part 350 which has a proximal end 352 and a distal end 354. A linking member 356 is provided on the distal end 354 for engaging a standard pipe. It is preferred that the linking member 356 have an inner diameter which is the same as an inner diameter of the linking member 326 found on the proximal end of the first elbow part 320. An arcuate socket 358 is disposed at the proximal end 352 of the second elbow part 350. The curvature of the socket 358 provides the socket 358 with an inner aspect 360 and an outer aspect 362.

Figure 29:
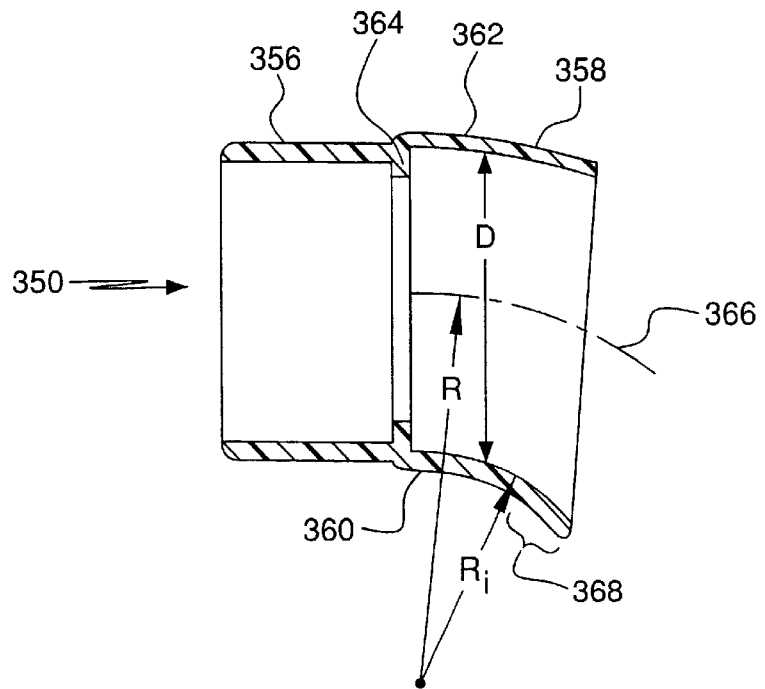
FIG. 29 shows a longitudinal cross-section of the second elbow part shown in FIG. 28.

FIG. 29 is a cross sectional view of the second elbow part as shown in FIG. 28. The second elbow part 350 is provided with an internal boss 364, similar to the internal boss described with reference to FIGS. 1 and 4. The arcuate socket 358 has a central axis 366 which has a constant axial radius of curvature R, the same as that of the central axis 336 of the first elbow part 320. For reasons well known to those skilled in the art, it is preferable that the inside surface of sockets be tapered. Thus, it is preferred that the inside dimension of the proximal end of arcuate socket 358 be slightly larger than the inside dimension of the distal end of the arcuate socket 358. The arcuate socket 358 has an inner dimension D at some point between its distal and proximal ends, similar to the dimension D described above with reference to FIG. 2. The dimension D of arcuate socket 358 is the same as the dimension D of arcuate segment 328, it being understood that the dimension D may vary slightly according to manufacturing tolerances.

The inside surface of the inner aspect 360 is an arc having a substantially constant inner radius of curvature $R_i$, the same as that of the outside surface of the inner aspect 330 of the first elbow part 320, with some variance due to tapering and tolerance. In order to form the arc defined by the inside surface of the inner aspect 360, inner aspect 360 is provided with an extended lip region 368. For reasons explained in greater detail below, the inside surface of the extended lip region 368 defines an arc having the substantially constant inner radius of curvature $R_i$.

In an embodiment of the invention sized to fit within a 1.5 inch standard pipe system, the inner dimension D of the distal end of the arcuate socket 358 most preferably is about 1.989 inches. The preferred inner dimension of the proximal end of the arcuate socket 358 can be best represented by the lengths of normal lines from the arc defined by the constant radius of curvature R. The length of a normal line from the arc defined by the radius R to the proximal end of the inside surface of the outer aspect 362 is most preferably 0.997 inches. The length of a normal line from the arc defined by the radius R to the proximal end of the inside surface of the inner aspect 360 (the proximal end of lip region 368) is preferably 1.004 inches.

Figure 30:
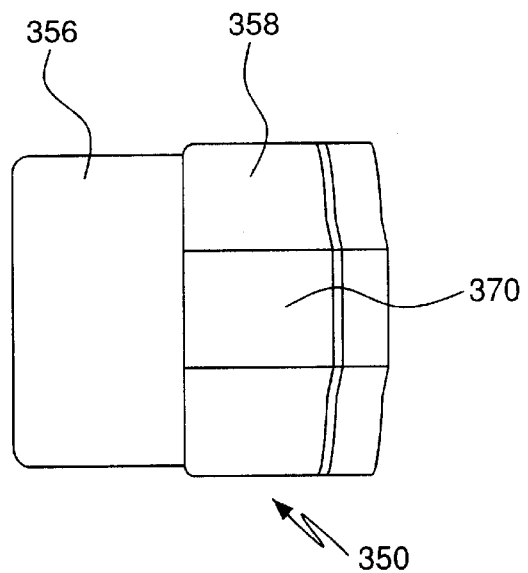
FIG. 30 is a top plan view of the second elbow part shown in FIG. 28.

FIG. 30 is a view of the outer aspect 362 of the second elbow part 350. The arcuate socket 358 is provided with a flat alignment plane 370 (shown in FIG. 30 from the outside surface) on the inside surface of the outer aspect 362. The alignment plane 370 is capable of corresponding with the alignment plane 340 of the first elbow part 320 so as to guide proper insertion of the first part 320 into the second part 350 in a manner similar to that described with regard to FIGS. 14 and 23 above.

Figure 31:
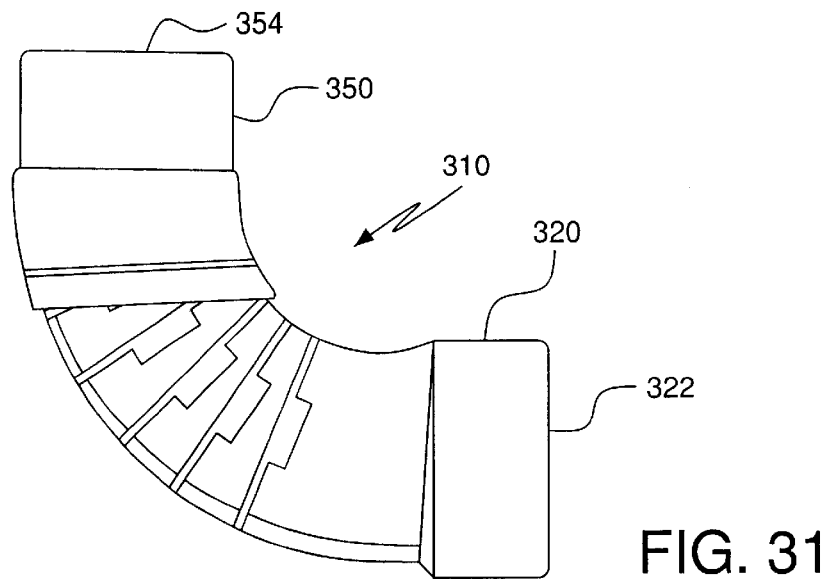
FIG. 31 is a side plan view of an assembled elbow according to the embodiment of FIG. 24.
Figure 32:
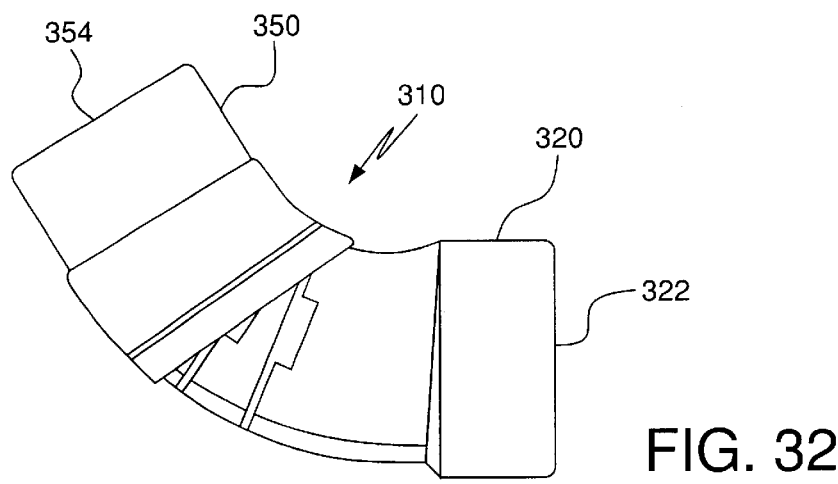
FIG. 32 is a side plan view of the assembled elbow of FIG. 31 cut to a lesser angle.
Figure 33:
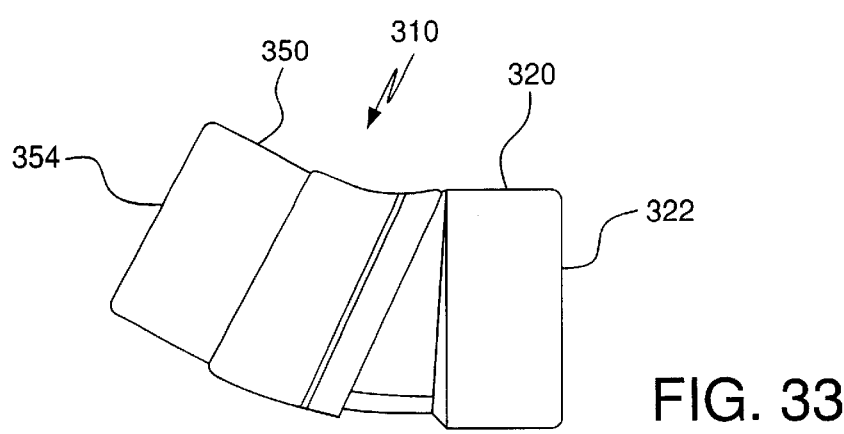
FIG. 33 is a side plan view of the assembled elbow of FIG. 32 cut to an even lesser angle.
Figure 34:
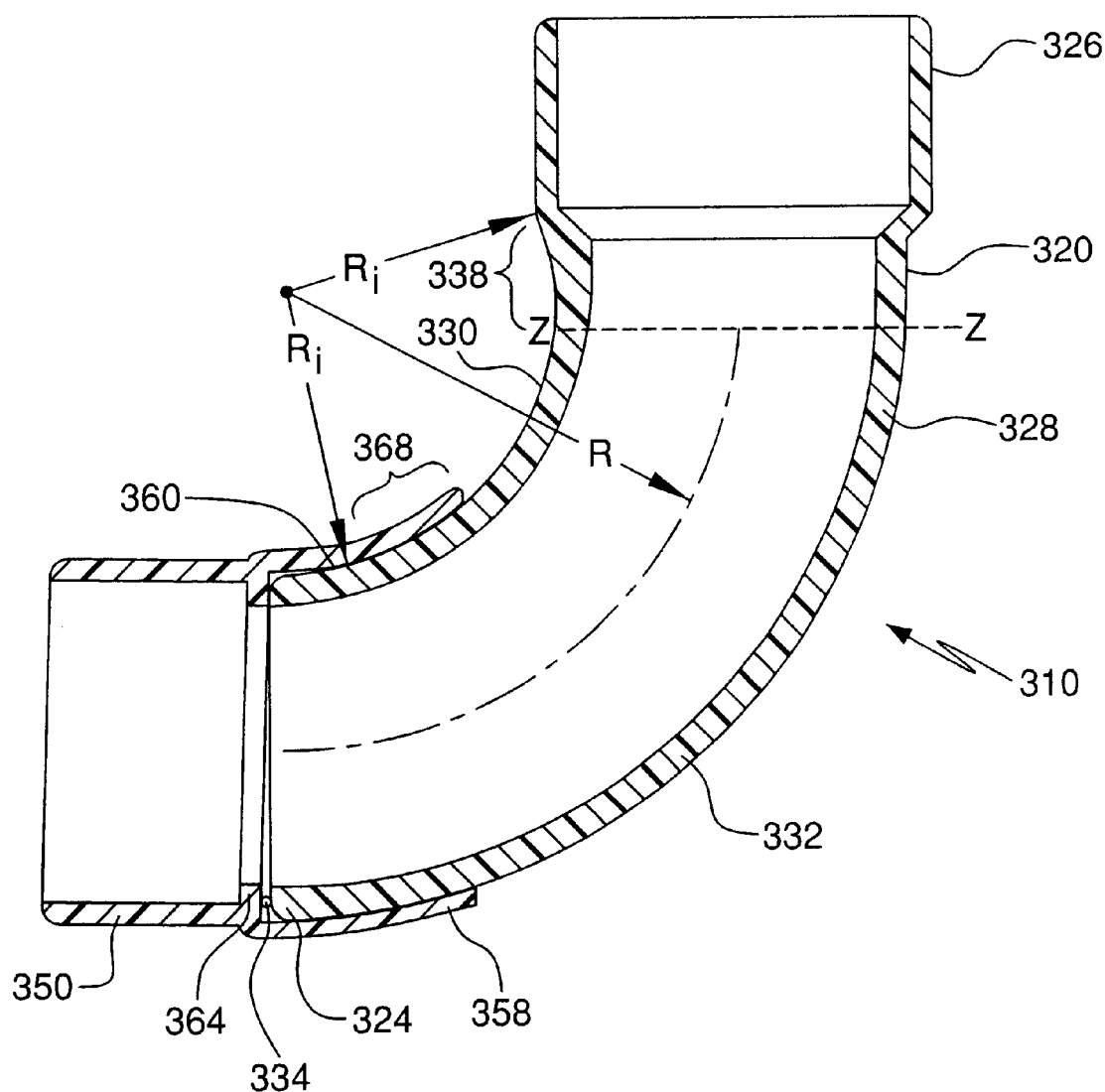
FIG. 34 is a longitudinal cross-sectional view of the elbow of FIG. 31.

The mating of the two elbow parts to form pipe elbow 310 is shown in FIGS. 31 through 33. In the same manner as is described above with reference to FIGS. 12 through 14, the first part 320 is provided with reference marks and cutting guides. The first part 320 can be cut at a selected angle such that the elbow 310, upon mating of the parts, will fit within a run of pipe requiring the selected angle. FIG. 31 shows the mating of the two elbow parts forming roughly a 90 degree angle. FIG. 32 shows the mating of the two parts after the first part has been cut to roughly a 33 degree angle. FIG. 34 shows the mating of the two parts after the first part 320 has been cut at the cutting guide closest to its proximal end 322.

FIG. 34 is a cross sectional view of the mating shown in FIG. 31. When the distal end 324 of the first elbow part 320 is inserted into the socket 358 of the second part 350 and stops against the boss 364, the inside surface of the inner aspect 360 of the second elbow part 350, in conjunction with the outer surface of the inner aspect 330 of first elbow part 320, ensures a minimum extension or overlap between the two parts. The elbow 310 has a constant axial radius of curvature R which defines the central axes 336, 366 of the first and second parts. The elbow 310 further has a substantially constant inner radius of curvature $R_i$ defined by the outside surface of the inner aspect 330 of the first part 320 and the inside surface of the inner aspect 360 of the second part 350. The substantially constant radius of curvature $R_i$ extends from the plane ZZ toward the proximal end 322 along region 338 toward the point where the arcuate segment 328 meets the linking member 326. Most preferably, the surface of substantially constant curvature along region 338 extends to the outer surface of the linking member 326, as seen in the Figures. The overall curvature of radius $R_i$ contains a greater number of degrees than does the curvature of radius R (approximately 90 degrees in FIG. 34).

Figure 35:
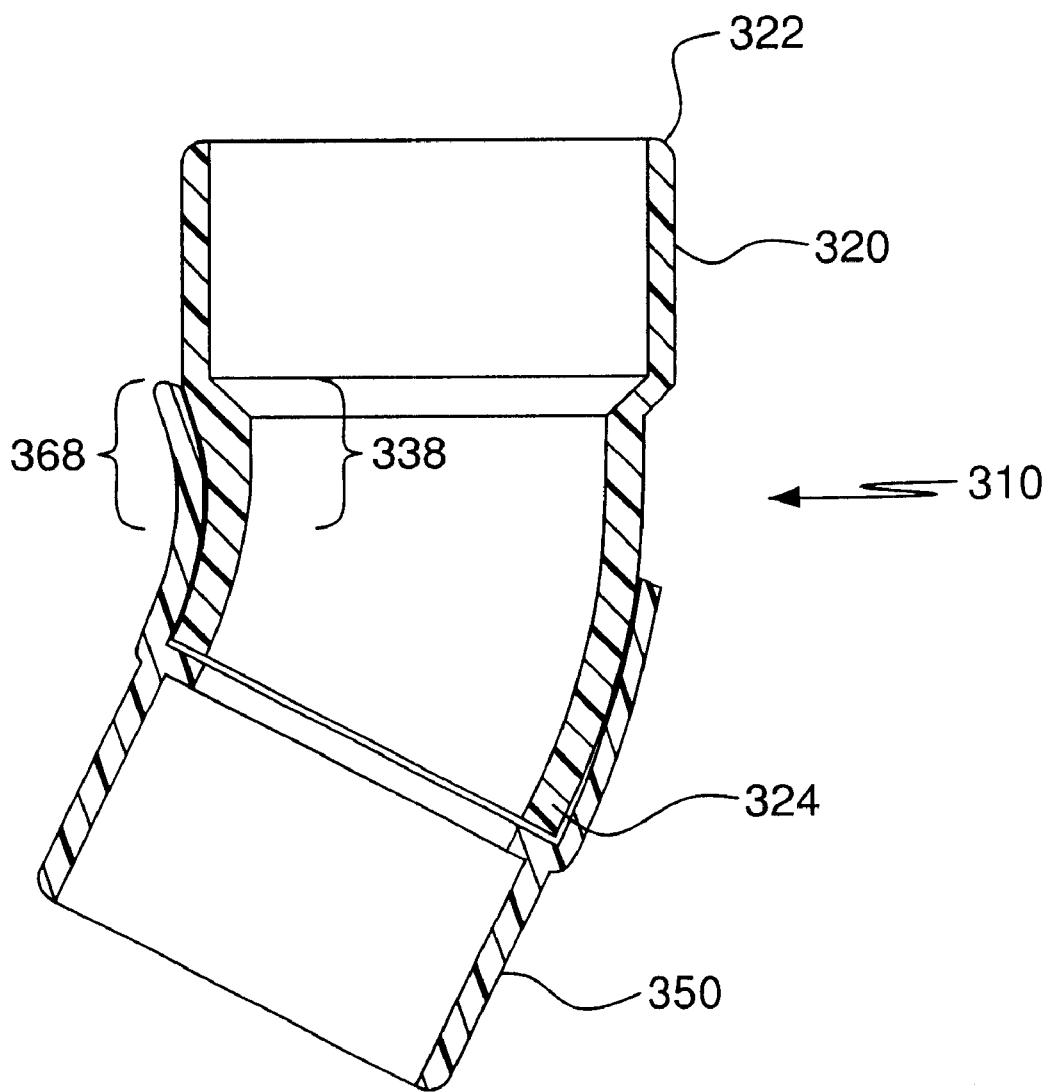
FIG. 35 is a longitudinal cross-sectional view of the elbow of FIG. 33.

FIG. 35 shows the elbow 310 in cross section with first part 320 cut similarly to that shown in FIG. 33. A minimum extension or overlap between the two parts is ensured by the extended region of curvature 338 of the first elbow part 320 and the extended lip region 368 of the second elbow part 350, even when the distal end 324 of the first elbow part 320 is cut at the cutting guide closest to the proximal end 322 of the first elbow part 320. (Cutting the distal end 324 at the cutting guide closest to the proximal end 322 creates a predetermined minimum angle for compliance with an industry standard, once the two parts are mated.) Otherwise, when the first elbow part is cut short, there may be insufficient overlap of the first and second parts to ensure proper mating of the two parts. In contrast, the overlap provided will meet an industry standard for minimum insertion of mating parts. For other contemplated uses of the elbow, which must meet a different standard for minimum overlap, a pipe fitter can cut the first elbow part 320 even closer to the proximal end 322. When the first elbow part 320 is cut closer to the proximal end 322 than the closest cutting guide, the second elbow part 350 must also be cut to accommodate insertion of the distal end 324 of the first part 320.

Figure 36:
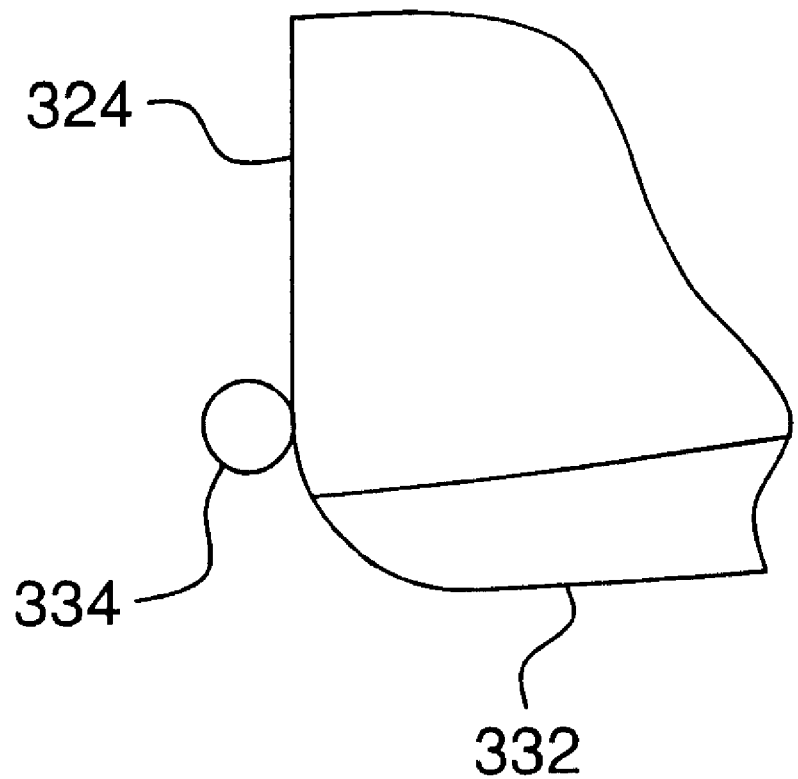
FIG. 36 is an enlarged view of a portion of FIG. 25.

FIG. 36 is an enlarged view of a portion of FIG. 25. As noted above, a frangible tab 334 is provided on the distal end 324 of the first elbow part 320. The frangible tab 334 is similar to tabs 36 and 136 described above with reference to FIGS. 9, 10, 12, 14 and 16. As shown in FIG. 34, frangible tab 334 abuts the internal boss 364 once the two parts are mated. The abutment of the frangible tab 334 to boss 364 prevents the distal end 324 of the outer aspect 332 of the first part 320 from abutting the boss 364. In the most preferred form of this embodiment, the mating of the two parts forms a 90 degree angle with the frangible tab 334 in place. In FIG. 12, the 90 degree angle is represented by the angle P. Removal of the frangible tab 334 allows the distal end 324 of the outer aspect 332 of the first part 320 to abut the boss 364 directly. In the same fashion as shown in FIG. 10, the abutment of the distal end 324 of the outer aspect 332 of the first part 320 against the boss 364 causes a small change (Q) in the angle (P) formed by the two mated parts. The removal of the frangible tab 334 causes mating of the parts to form an elbow preferably having an angle (P) of approximately 88 degrees.

The present invention may be embodied in other specific forms without departing from the spirit or essential attributes thereof and, accordingly, reference should be made to the appended claims, rather than to the foregoing specification, as indicating the scope of the invention.

What is claimed is:

1. A selectable angle pipe elbow comprising:

a first part and a second part, each part having a proximal and a distal end, an inside and an outside surface, and an inner and an outer aspect;

the first part having a linking member at its proximal end and an arcuate segment at its distal end, the arcuate segment having a constant axial radius of curvature R defining a first arc, the outside surface of the inner aspect of the arcuate segment of the first part defining a second arc, the second arc being a greater number of degrees than the first arc; and the second part having a linking member at its distal end and an arcuate socket at its proximal end capable of receiving the arcuate segment of the first part.

2. The selectable angle pipe elbow of claim 1 wherein the arcuate socket further comprises an extended lip region disposed on the proximal end of its inner aspect, the inside surface of the extended lip region having a radius of curvature substantially equal to the radius of curvature of the second arc of the arcuate segment of the first elbow part.

3. The selectable angle pipe elbow of claim 1 wherein the linking member of the first part has an outer cross-sectional dimension which is greater than an outer cross-sectional dimension of the arcuate segment of the first part.

4. The selectable angle pipe elbow of claim 1 wherein the outside surface of the inner aspect of the arcuate segment of the first part has a constant radius of curvature.

5. The selectable angle pipe elbow of claim 1 wherein the second arc has a point through which a normal line is within a plane transecting the arcuate segment, a central axis of the arcuate segment being the first arc between the distal end and the plane, the central axis being a line extending from the place toward the proximal end of the first part.

6. The selectable angle pipe elbow of claim 5 further comprising a curved region on the outside surface of the inner aspect of the arcuate segment of the first part, the curved region being substantially disposed between the plane and the linking member of the first part.

7. The selectable angle pipe elbow of claim 6 wherein the inner aspect of the arcuate segment at the curved region is thicker than the inner aspect of the arcuate segment between the distal end and the plane.

8. The selectable angle pipe elbow of claim 6 wherein the second part further comprises an extended lip region disposed on the proximal end of its inner aspect, the inside surface of the extended lip region having a radius of curvature corresponding with the second arc of the arcuate segment of the first elbow part, the extended lip region being capable of engaging the curved region when the distal end of the first part is cut to a predetermined minimum angle.

9. The selectable angle pipe elbow of claim 1 further comprising:

an internal boss disposed within the second elbow part between the proximal and distal ends of the second part;

a frangible tab on the distal end of the first part for preventing the outer aspect of the distal end of the first part from touching the boss of the second part.

10. The selectable angle pipe elbow of claim 1 further comprising:
an internal boss disposed within the second elbow part between the proximal and distal ends of the second part;
an extension on the outside surface of the first part for preventing the distal end of the first part from touching the boss of the second part.

11. The selectable angle pipe elbow of claim 1 further comprising:
a first flat alignment plane on the outside surface of the arcuate segment of the first part, and
a second flat alignment plane on the inside surface of the arcuate socket of the second part, the second alignment plane corresponding in size and location to the first alignment plane.

12. A selectable angle pipe elbow comprising:
two parts, each part having an inside and an outside surface, an inner and an outer aspect, and a proximal and a distal end;
the first part comprising a linking member on its proximal end, and an arcuate segment having an outer cross-sectional dimension at its distal end, a constant axial radius of curvature R, the outside surface of its inner aspect defining a substantially constant inner radius of curvature $R_i$, the substantially constant inner radius of curvature $R_i$ extending from the linking member to the distal end of the first part;
the second part comprising a linking member, an internal boss between the distal end and the proximal end, and an arcuate socket having an inner cross-sectional dimension at a point between its distal and proximal ends, the inner cross-sectional dimension being equal to the outer cross-sectional dimension of the arcuate segment, a constant axial radius of curvature R, and a lip disposed on its proximal end, the lip having an inner radius of curvature $R_i$ defined by the inside surface of its inner aspect.

13. The selectable angle pipe elbow of claim 12 further comprising a thickened portion on the inner aspect of the arcuate segment of the first part where the linking member meets the arcuate segment, the thickened portion forming a portion of the substantially constant inner radius of curvature $R_i$.

14. The selectable angle pipe elbow of claim 12 further comprising means for aligning the arcuate socket of the second part with the arcuate segment of the first part.

15. The selectable angle pipe elbow of claim 14, wherein the aligning means comprises a non-circular cross-sectional configuration for at least the distal end of the first part and the proximal end of the second part.

16. The selectable angle pipe elbow of claim 12 further comprising a frangible tab on the distal end of the first part for preventing the outer aspect of the distal end of the first part from touching the boss of the second part.

17. The selectable angle pipe elbow of claim 12, wherein the linking member of the first part has an outside cross-sectional dimension greater than the outside cross-sectional dimension of the arcuate segment, he linking member forming an external shoulder where the outside surface of the linking member ends, the shoulder being in contact with the arcuate segment of the first part at a point where the inner aspect of the arcuate segment has the substantially constant inner radius of curvature $R_i$.

18. The selectable angle pipe elbow of claim 17 wherein the second part further comprises a lip on its proximal end shaped to conform to the outside surface of the inner aspect of the arcuate segment of the first part at the point where the shoulder contacts the arcuate segment of the first part.

19. A selectable angle pipe elbow comprising:
a first part having
a proximal end and a distal end,
a linking member on the proximal end,
and an arcuate segment on the distal end, the linking member having a shoulder formed transverse to a proximal end of a central axis of the arcuate segment, the arcuate segment having
an inner aspect having an outside surface,
a point on the outside surface of the inner aspect through which a normal line is parallel with the linking member shoulder,
a first curve on the outside surface of the inner aspect of the arcuate segment between the point and the distal end, the first curve having tangent lines forming angles of between 90 and 180 degrees with the normal line,
a second curve on the outside surface of the inner aspect of the arcuate segment between the point and the proximal end, the second curve having tangent lines forming angles of between 180 and 270 degrees with the normal line when measured in the same direction as the angles between the tangent lines of the first curve and the normal line; and
a second part having a linking member and an arcuate socket capable of receiving the arcuate segment of the first part.

20. A selectable angle pipe elbow comprising:
two parts, each part having an inside and an outside surface, an inner and an outer aspect, and a proximal and a distal end;
the first part comprising a linking member on its proximal end, and an arcuate segment having an outer cross-sectional dimension, a constant axial radius of curvature R, and a frangible tab disposed on the outer aspect of its distal end;
the second part comprising a linking member, an arcuate socket having an inside cross-sectional dimension corresponding with the outer cross-sectional dimension of the arcuate segment and a constant axial radius of curvature R, and an internal boss disposed between the distal end and the proximal end; and
the frangible tab being capable of preventing the outer aspect of the distal end of the first part from abutting the boss of the second part.

21. The selectable angle pipe elbow of claim 20 wherein the frangible tab is a solid cylinder tangentially attached to the distal end of the first part.

22. The selectable angle pipe elbow of claim 20 wherein the frangible tab has an outer dimension greater than the area of connectivity between the frangible tab and the distal end of the first part.

23. A selectable angle pipe elbow comprising:
a first part having
a proximal end and a distal end,
an arcuate segment between the proximal end and the distal end, the arcuate segment having a center of curvature C, an outer aspect with an outside surface, an inner aspect with an outside surface, and a transition point on the outside surface of the inner aspect adjacent the proximal end, the distance from the center of curvature C to the outside surface of the outer aspect being a constant radius $R_o$ only between the distal end and a line normal to the inner aspect at the transition point, the distance from the center of curvature C to the outside surface of the inner aspect being a substantially constant radius $R_i$ between the distal end and a point situated between the transition point and the proximal end; and a second part having an arcuate socket adapted to receive the arcuate segment of the first part.

24. The selectable angle pipe elbow of claim 23 wherein the distance from the center of curvature C to the outside surface of the outer aspect between the normal line and the proximal end is greater than $R_o$.

* * * * *